United States Patent [19]

Heath et al.

[11] 4,001,032

[45] Jan. 4, 1977

[54] METHOD OF MAKING NONGELLING AQUEOUS CATIONIC DIALDEHYDE STARCH COMPOSITIONS

[75] Inventors: Harley D. Heath; Bernard T. Hofreiter; Adrian J. Ernst, all of Peoria, Ill.

[73] Assignee: The United States of America as represented by the Secretary of Agriculture, Washington, D.C.

[22] Filed: Aug. 13, 1975

[21] Appl. No.: 604,363

[52] U.S. Cl. .............................. 106/213; 162/175
[51] Int. Cl.² .................................... C08L 3/04
[58] Field of Search .................. 106/213; 162/175; 260/233.3 R, 233.3 A

[56] References Cited

UNITED STATES PATENTS 3,251,826   5/1966   Mehitretter ................. 260/233.3 R

OTHER PUBLICATIONS

Chem. Abst. 58: 14,281c.

*Primary Examiner*—Theodore Morris
*Attorney, Agent, or Firm*—M. Howard Silverstein; David G. McConnell; Curtis P. Ribando

[57] ABSTRACT

A new process is presented for preparing cationic dialdehyde starch product and converting same into a storable concentrated liquid form for shipping. The fluid product is ready for application in the manufacture of paper having high dry- and wet-strength properties without additional dispersing or cooking.

5 Claims, No Drawings

METHOD OF MAKING NONGELLING AQUEOUS CATIONIC DIALDEHYDE STARCH COMPOSITIONS

BACKGROUND OF THE INVENTION

This invention relates to a method of making cationic dialdehyde starch compositions which are useful as wet- and dry-strength additives for paper and paper products.

It is common practice in the manufacture of paper to apply expensive specialty chemicals to the papermaking process, e.g., to the fiber slurry or "wet end," in liquid or solution form. It is obvious that preparation of such chemical solutions, whether done at the paper mill or at a supplier's manufacturing plant, is most economical when made at as high a concentration as possible without adversely affecting fluidity of the final product. It is particularly desirable to make high concentration of those chemicals, such as cationic dialdehyde starch, which require heat input during the dispersion process, as the energy cost per unit of cationic dialdehyde starch is, thereby, decreased. Also, shipping and storage costs are less per unit as the solids concentrations increase. In the specific case of cationic dialdehyde starch, which is synthesized in situ in the dispersion process by reaction of dialdehyde starch (DAS) and betaine hydrazide hydrochloride, further significant economy is effected during preparation when the quantities of the relatively more expensive betaine hydrazide HCl are minimized while maintaining the effectiveness of the cationic dialdehyde starch to provide wet and dry strength to paper.

Cationic dialdehyde starch products for use as dry- and wet-strength agents in papermaking have been prepared by simultaneously derivatizing and dispersing DAS in dilute (3–5%) aqueous media. Thus, Mehltretter (U.S. Pat. No. 3,251,826) formed cationic starch hydrazones by introducing DAS to water (2.9% DAS) followed by 5% (DAS basis) betaine hydrazide hydrochloride dissolved in a few milliliters of acidified water. The mixture was heated (90° C.) and stirred for 0.5 hour to complete dispersion.

Previous investigations [Hamerstrand et al., Tappi 46(7): 400 (1963)] using DAS and amounts of cationic hydrazide to give from 0.02 to 0.14 degree of substitution achieved optimum wet-strength development at 0.05 degree of substitution (5% betaine hydrazide hydrochloride, DAS basis).

Prior research utilizing cationic DAS dispersions for wet strength in paper describes only 3–5% DAS concentrations. These low concentrations would cause considerable difficulties in readying large (1000 gallons or more) batch quantities in a paper mill. On the other hand, if such low-concentration dispersions were manufactured it would be impractical (economically) to ship them to distant locations.

The prior art teaches and emphasizes that reaction time between DAS (3% concentration at about 90° C.) and betaine hydrazide hydrochloride must not appreciably exceed 0.5 hour because further heating progressively degrades DAS which then becomes less effective as a wet-strength agent. We were surprised, therefore, when we found a method of making stable, nongelling, high-concentration aqueous cationic dialdehyde starch compositions useful for imparting wet and dry strength to paper and paper products comprising reacting dialdehyde starch in aqueous dispersions at concentrations of about 15% by weight with betaine hydrazide hydrochloride in amounts equal to from 3–5% of the dry weight of DAS at from 90° to 95° C. for a time sufficient (i.e., from 2.3 to 3.6 hours depending on the amount of betaine hydrazide hydrochloride) to form aqueous dispersions having a pH of from 2.5 to 3.5 which remain fluid when cooled to 25° C.

The product of the invention has all of the above-mentioned advantages of a high-concentration dispersion plus the added advantage of being more effective than prior art cationic DAS dispersions in that a composition prepared according to the invention containing 3% betaine hydrazide hydrochloride gave wet strength essentially equivalent to that given by a prior art composition containing 5% betaine hydrazide hydrochloride, all other parameters being equal.

DETAILED DESCRIPTION OF THE INVENTION

The product of the invention is a composition comprising a 15% by weight aqueous dispersion of DAS betaine hydrazone hydrochloride which contains a betaine hydrazone moiety equal to 3–5% of the weight of the DAS moiety. The dispersions are highly stable remaining fluid (i.e., pourable and pumpable) for at least 8 months at room temperature (25° C.).

Granular DAS is dispersed in water containing the betaine hydrazide hydrochloride, stirred to maintain DAS in suspension, and heated rapidly to from 90°–95° C. The reaction is as follows:

 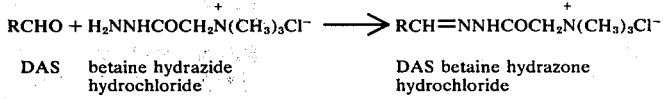

DAS    betaine hydrazide hydrochloride      DAS betaine hydrazone hydrochloride

The DAS granules swell as they imbibe water and react with the betaine hydrazide hydrochloride, and within a few minutes after granule swelling commences, the slurry forms a solid gel. The gels are maintained without stirring at reaction temperatures of from 90° to 95° C., preferably 92° C. After a holding time that is inversely related to the relative amounts of betaine hydrazide hydrochloride used, the composition will fluidize (i.e., become pourable). When the compositions are cooled to 25° C. immediately following the disappearance of the gel, the composition will gel again within 1 to 12 hours. However, contrary to expectations, we accidentally discovered that holding the gels at 90° to 95° C. for periods of time longer than the time it takes for the gels to fluidize the compositions would become stable and remain fluid at 25° C. for at least 8 months. Holding time is critical and depends on the amount of betaine hydrazide hydrochloride used in the reaction. At 3% (by dry weight of DAS) betaine hydrazide hydrochloride, the minimum holding time to form a stable fluid composition is from about 3.0 to 3.6 hours, and at 5% betaine hydrazide hydrochloride minimum holding time is from about 2.3 to 3.0 hours. Minimum holding times sufficient to form aqueous dispersion of the invention which remain fluid when cooled to 25° C. can be determined easily by making the composition containing the desired amounts of reactants, holding the products at 90° to 95° C., removing small aliquots at determined intervals, cooling the aliquots to 25° C., and holding each aliquot at 25° C. for about 48 hours. The first aliquot to remain fluid at 25° C. for 48 hours will represent the proper holding time for that product. Aliquots taken at a time which is close to the minimum holding time may take as long as 12 hours to gel. Heating products containing from 3–5% betaine hydrazone hydrochloride at 90° to 95° C. for a time which is in excess of the minimum holding time resulted in decreases in dry- and wet-strength properties.

The natural pH of the initial dispersion is about 4.5 which decreases to from 2.5 to 3.2 in the final composition. This final pH is desirable for maximum storage stability and a pH of about 3 is preferred.

Suitable starting materials can be obtained commercially. Betaine hydrazide hydrochloride, also known as Girard T-reagent, has the following structure: $H_2NNHCON^+(CH_3)_3Cl^-$. Dialdehyde starch, also commercially available, is prepared by the periodic acid oxidation of starch which can be controlled so that DAS containing any level of dialdehyde content can be obtained. However, DAS will be defined herein to include only those starch compositions in which at least 90% of the anhydroglucose units have been converted to dialdehyde units.

Water which is suitable as a reaction medium includes distilled water, soft water, and permanently hard water.

The following examples are intended only to further illustrate the invention and are not to be construed as limiting the scope of the invention which is defined by the claims. All percentages herein are by weight unless otherwise specified.

EXAMPLE 1

One hundred sixty-nine and three-tenths grams DAS (11.39% moisture, 150 g., d.b.) and 650 ml. of water were stirred together until all the DAS was wetted. A solution containing 4.5 g. of betaine hydrazide hydrochloride and 176 ml. water was added to the DAS slurry, and the entire mixture transferred to a reaction vessel which had been previously heated to 92° C. The mixture was stirred and heated at 92° C. until a gel formed, at which time stirring was stopped and the heating continued. Samples of the dispersion were taken from the reaction mixture at intervals, cooled to 25° C., and allowed to stand for about 12 hours.

Each of the samples was added to a kraft paper pulp in amounts such that the pulp containing 1.5% DAS betaine hydrazone hydrochloride based on dry fiber weight. Handsheets were prepared according to TAPPI Standard T 205 m-53 and the handsheets were tested for wet tensile breaking strength according to TAPPI Standard T 456 os-68 using a 5-minute water soaking time prior to the test. The results are in Table 1.

EXAMPLE 2

An aqueous dispersion of DAS betaine hydrazone hydrochloride was prepared as described in Example 1 except that an amount of betaine hydrazide hydrochloride equaling 5% of the dry weight of DAS was used. Handsheets were prepared and tested as described in Example 1. See Table 1 for results.

EXAMPLE 3

An aqueous dispersion of DAS betaine hydrazone hydrochloride was prepared as described in Example 1 except that the reaction temperature was 95° C. Handsheets were prepared and tested as described in Example 1. See Table 1 for results.

EXAMPLE 4

An aqueous dispersion of DAS betaine hydrazone hydrochloride was prepared as described in Example 2 except that the reaction temperature was 95° C. Handsheets were prepared and tested as described in Example 1. See Table 1 for results.

EXAMPLE 5

For comparative purposes an aqueous dispersion of DAS betaine hydrazone hydrochloride was prepared in accordance with a prior art method. In the manner described in Example 1, 169.3 g. DAS (11.39% moisture; 150 g. d.b.), 7.5 g. betaine hydrazide hydrochloride, and 4980 ml. of water were heated together at 95° C. The heating was continued for 3 hours while samples of the dispersions were taken and cooled. Handsheets were prepared and tested as described in Example 1. See Table 1 for results.

EXAMPLE 6

An aqueous dispersion of DAS betaine hydrazone hydrochloride was prepared as described in Example 1 except that an amount of betaine hydrazide hydrochloride equaling 2.3% of the dry weight of DAS was used and the reaction temperature was 90° C. Handsheets were prepared and tested as described in Example 1. See Table 1 for results.

EXAMPLE 7

An aqueous dispersion of DAS betaine hydrazone hydrochloride was prepared, and handsheets were made and tested as described in Example 1, except that the reaction temperature was 90° C. See Table 1 for results.

EXAMPLE 8

An aqueous dispersion of DAS betaine hydrazone hydrochloride was prepared, and handsheets were made and tested as described in Example 2, except that the reaction temperature was 90° C. See Table 1 for results.

Table 1

| Example | Betaine hydrazone hydrochloride in cationic DAS, % | Concentration of cationic DAS composition, % | Reaction temp., °C | Heating time, hours | Condition of[2] composition at 25° C. | Breaking[3] length of handsheet, m. |
|---|---|---|---|---|---|---|
| 1 | 3 | 15 | 92° | 2.5 | gel | 2200 |
|  |  |  |  | 3.0 | gel | 2045 |
|  |  |  |  | 3.6[1] | fluid | 1860 |
|  |  |  |  | 4.0 | fluid | 1700 |
| 2 | 5 | 15 | 92° | 2.0 | gel | 2060 |
|  |  |  |  | 2.3 | gel | 1940 |
|  |  |  |  | 3.0[1] | fluid | 1660 |

Table 1-continued

| Example | Betaine hydrazone hydrochloride in cationic DAS, % | Concentration of cationic DAS composition, % | Reaction temp., °C | Heating time, hours | Condition of[2] composition at 25° C. | Breaking[3] length of handsheet, m. |
|---|---|---|---|---|---|---|
|   |   |   |   | 4.0 | fluid | 1320 |
| 3 | 3 | 15 | 95° | 1.8 | gel | 1900 |
|   |   |   |   | 2.5 | gel | 1440 |
|   |   |   |   | 3.0[1] | fluid | 1180 |
|   |   |   |   | 4.0 | fluid | 700 |
| 4 | 5 | 15 | 95° | 1.7 | gel | 1880 |
|   |   |   |   | 2.3[1] | fluid | 1520 |
|   |   |   |   | 3.0 | fluid | 1240 |
|   |   |   |   | 4.0 | fluid | 860 |
| 5 | 5 | 3 | 95° | 0.7 | fluid | 2040 |
|   |   |   |   | 1.0 | fluid | 1680 |
|   |   |   |   | 3.0 | fluid | 400 |
| 6 | 2.3 | 15 | 90° | 3.0 | gel | 1800 |
|   |   |   |   | 5.3[1] | fluid | 920 |
| 7 | 3 | 15 | 90° | 2.2 | gel | 2060 |
|   |   |   |   | 3.4[1] | fluid | 2000 |
| 8 | 5 | 15 | 90° | 1.9 | gel | 2000 |
|   |   |   |   | 2.7[1] | fluid | 2100 |

[1]Minimum holding time to produce dispersion which is fluid and stable at 25° C.
[2]After 48 hours.
[3]Breaking length for a handsheet containing no additives is 226 m.

We claim:
1. A process of making stable, nongelling, high-concentration, aqueous cationic dialdehyde starch compositions useful for imparting wet and dry strength to paper and paper products comprising reacting dialdehyde starch (DAS) in aqueous dispersions at concentrations of about 15% by weight with betaine hydrazide hydrochloride in amounts equal to from 3 [-] to 5% of the dry weight of DAS at a temperature of from about 90° C. to 95° C., and holding the resultant reaction mixtures at said temperature for a time inversely related to the amounts of said betaine hydrazide hydrochloride and sufficient to form aqueous dispersions having a pH of from 2.5 to 3.5 which remain fluid when cooled to 25° C.

2. A process as described in claim 1 wherein the amount of betaine hydrazide hydrochloride is equal to 3% of the dry weight of DAS, and the reaction time is from about 3.0 to 3.6 hours.

3. A process as described in claim 1 wherein the amount of betaine hydrazide hydrochloride is equal to 5%, and the time of reaction is from about 2.3 to 3.0 hours.

4. A process as described in claim 1 wherein the DAS is reacted with betaine hydrazide hydrochloride at a temperature of about 92° C.

5. A stable, nongelling, high-concentration, aqueous cationic dialdehyde starch composition useful in imparting wet and dry strength to paper and paper products comprising a 15% by weight dispersion of dialdehyde starch betaine hydrazone hydrochloride which contains a betaine hydrazone moiety equal to from 3–5% of the weight of dialdehyde starch moiety.

* * * * *